Patented June 14, 1949

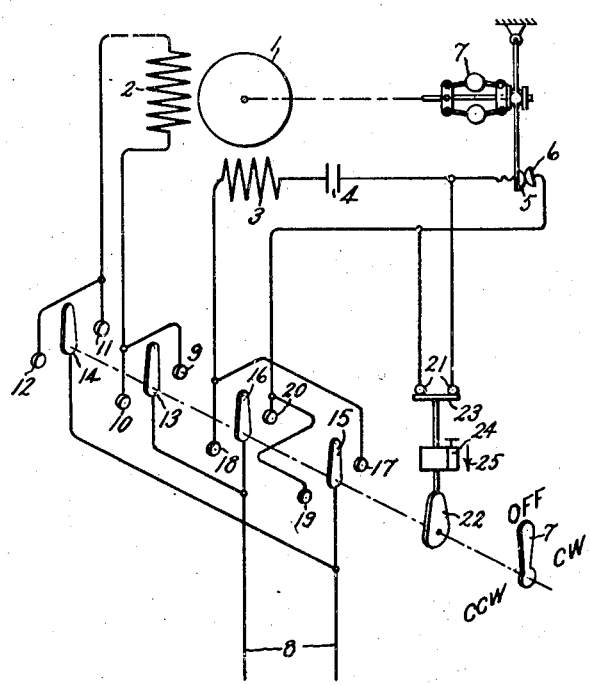

2,473,244

UNITED STATES PATENT OFFICE 2,473,244

DYNAMOELECTRIC MACHINE

Roger A. Fuller, Fort Wayne, Ind., assignor to General Electric Company, a corporation of New York Application December 28, 1945, Serial No. 637,673

6 Claims. (Cl. 318—207)

1

My invention relates to dynamoelectric machines and particularly to reversible induction motors having starting windings which are adapted to be energized in opposite directions for obtaining rotation of the machine in opposite directions.

An object of my invention is to provide an improved reversible type dynamoelectric machine.

Another object of my invention is to provide an improved dynamoelectric machine of the induction motor type adapted to operate in both directions of rotation.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic diagram of a capacitor type motor illustrating one embodiment of my invention.

Referring to the drawing, I have shown a capacitor type induction motor provided with an embodiment of my invention and having a rotatable member 1 provided with a conventional type winding which may be of the squirrel cage type and a stationary member having a running field exciting winding 2 and a starting field exciting winding 3 which is arranged with corresponding parts thereof displaced from the running field exciting winding 2. In this system, the starting field exciting winding 3 is connected in series with a capacitor 4 and contacts 5 and 6 of a centrifugal switch which forms part of a circuit breaker operable in response to the speed of the rotatable member 1 by any suitable centritrifugal mechanism 7 for opening the circuit of the starting winding 3 above a predetermined speed and for reclosing this open circuit below a predetermined rotatable member speed. In this arrangement, I provide a reversing switch 7 which is adapted to close the circuit of the motor on a source of electrical power supply 8 for rotation of the motor in a clockwise direction as indicated by the letters "CW" in the drawing and for alternately closing the circuit of the motor on the source of electrical power supply for rotation in the opposite direction; that is in a counterclockwise direction, as indicated by the letters "CCW" on the drawing. Since an induction motor of this type is adapted to continue rotating in either direction when the rotatable member 1 has been started and is operating above a

2 predetermined speed when the running field exciting winding 2 is energized in the same sense on closure of the reversing switch 7 in either direction. As shown, the terminal of the running field exciting winding 2 on one side thereof, connected to contacts 9 and 10, and the terminal of the other side of the winding 2, connected to the contacts 11 and 12, are adapted to be closed across the source of energization 8 by contactors 13 and 14, respectively, for energization in the same direction. In order to reverse the direction of rotation of the rotatable member 1, it, therefore, is necessary that the starting field exciting winding 3 be energized in opposite directions, and this is obtained by rendering ineffective the effects of the speed responsive circuit breaker 5—6—7 by connecting the terminals of this field exciting winding 3 for reverse energization by reversing switch contactors 15 and 16. As shown, one terminal of the field exciting winding 3 is connected to contacts 17 and 18, and the other terminal of the field exciting winding 3 is connected to terminals 19 and 20, such that the energization of the field exciting winding 3 by the source of electrical power supply 8 is in one direction when the reversing switch 7 is closed for a clockwise direction of rotation by connection of the source of power 8 to the terminals 17 and 20 and by connection of the terminals of the field exciting winding 3 to the switch contacts 18 and 19 when the reversing switch 7 is closed in a counterclockwise direction. This, however, would not be sufficient to obtain a reversal of direction of rotation of the rotatable member under most conditions, as when the rotatable member 1 is operating above a predetermined speed, the circuit of the starting field exciting winding is opened by the centrifugal switch through the contacts 5 and 6, and reversal of the reversing switch 7 would not energize the starting field exciting winding 3 as long as the centrifugal switch contacts 5 and 6 remain open, and, therefore, the speed of the rotatable member 1 would not decrease, and these contacts 5 and 6 would not close and the starting winding 3 would remain deenergized. In order to assure reversal of the motor substantially instantaneously, or at least within a very short period of time, the reversing switch 7 is provided with a time delay circuit breaker arrangement which includes contacts 21 connected across the speed responsive circuit breaker contacts 5 and 6. This time delay circuit breaker is adapted to close the circuit across the speed responsive circuit breaker contacts 5 and 6 on operation of the reversing switch 7 from one closed circuit position to the other by the operation of a suitable device, such as a cam 22, adapted to operate a contactor 23 of the time delay circuit breaker to closed circuit position across the contacts 21 as the switch 7 passes through its open circuit position. The time delay circuit breaker is provided with any suitable time delay device 24 which may be adjusted to remain in its closed circuit position for any desired predetermined time after it is released by the cam 22. Such a time delay mechanism 24 may be of the ticker interlock type or a dashpot mechanical time delay or any other suitable similar arrangement which is adapted to open the circuit through the contactor 23 by operation of the contactor, as indicated by the arrow 25 after a predetermined elapse of time after closure of this circuit breaker. Thus, when the reversing switch 7 is closed from one position to another closed circuit position, the starting field exciting winding 3 is energized in the opposite direction from that required for running the motor in the direction in which it originally operated, and this provides a braking torque in the motor which assists in bringing the rotatable member 1 to a quick stop and then exerts a starting torque for rotation of the rotatable member 1 in the opposite direction. This operation of the motor is equally applicable for reversal in direction of rotation from clockwise rotation to counterclockwise rotation and for the reversal from counterclockwise rotation to clockwise rotation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An induction motor having a rotatable member with a rotor winding, a running field exciting winding and a starting field exciting winding, means including a circuit breaker responsive to the speed of said rotatable member for opening and closing the circuit of said starting field exciting winding dependent on the rotatable member speed, means for energizing said running field exciting winding, means for connecting said starting field exciting winding for energization in opposite directions, a mechanical time delay means mechanically connected to said last named means and operable thereby for rendering ineffective the effects of said speed responsive circuit breaker for a predetermined time on connection of said starting field exciting winding for energization in either direction whereby said rotatable member may be stopped and restarted in either direction.

2. An induction motor having a rotatable member with a rotor winding, a running field exciting winding and a starting field exciting winding, means including a circuit breaker responsive to the speed of said rotatable member for opening and closing the circuit of said starting field exciting winding dependent on the rotatable member speed, means for energizing said running field exciting winding, means for connecting said starting field exciting winding for energization in opposite directions, and a mechanical time delay means mechanically connected to said last named means and operable thereby for closing the circuit of said starting field exciting winding across said speed responsive circuit breaker for a predetermined time on connection of said starting field exciting winding for energization in either direction whereby said rotatable member may be stopped and restarted in either direction.

3. An induction motor having a rotatable member with a winding, a stationary member with a running field exciting winding and a starting field exciting winding having corresponding parts thereof displaced from said running field exciting winding, a capacitance connected in series with said starting field exciting winding, means including a circuit breaker responsive to the speed of said rotatable member for opening and closing the circuit of said starting field exciting winding above and below a predetermined speed respectively, means for energizing said running field exciting winding, means for connecting said starting field exciting winding for energization in opposite directions, and a mechanical time delay means mechanically connected to said last named means and operable thereby for closing the circuit of said starting field exciting winding across said speed responsive circuit breaker for a predetermined time on connection of said starting field exciting winding for energization in either direction whereby said rotatable member may be stopped and restarted in either direction.

4. An induction motor having a rotatable member with a winding, a stationary member with a running field exciting winding and a starting field exciting winding, a capacitance connected in circuit with said starting field exciting winding, means including a circuit breaker responsive to the speed of said rotatable member for opening the circuit of said starting field exciting winding above a predetermined speed and for reclosing said open circuit below a predetermined rotatable member speed, means including a reversing switch for energizing said running field exciting winding in the same sense on a closure thereof in both directions, means including said reversing switch for connecting said starting field exciting winding for energization in opposite directions, and a circuit breaker of the mechanical time delay type mechanically connected to said reversing switch and operable thereby for closing the circuit of said starting field exciting winding across said speed responsive circuit breaker for a predetermined time on operation of said reversing switch from one closed circuit position to the other whereby said rotatable member may be stopped and restarted in either direction.

5. An induction motor having a rotatable member with a rotor winding, a running field exciting winding and a starting field exciting winding, means including a circuit breaker responsive to the speed of said rotatable member for opening and closing the circuit of said starting field exciting winding dependent on the rotatable member speed, means including a reversing switch for energizing said running field exciting winding in the same sense on a closure thereof in both directions, means including said reversing switch for connecting said starting field exciting winding for energization in opposite directions on closure thereof in opposite directions, and a mechanical time delay means mechanically connected to said reversing switch and operable thereby for closing the circuit of said starting field exciting winding across said speed responsive circuit breaker for an adjustable predetermined time on operation of said reversing switch from one closed circuit position to the other whereby a braking torque is generated on said motor rotating in one direction when said reversing switch is closed for rotation in the opposite direction so that said rotatable member may be stopped and restarted in either direction.

6. An induction motor having a rotatable member with a winding, a stationary member with a running field exciting winding and a starting field exciting winding having corresponding parts thereof displaced from said running field exciting winding, a capacitance connected in circuit with said starting field exciting winding, means including a circuit breaker responsive to the speed of said rotatable member for opening the circuit of said starting field exciting winding above a predetermined speed and for reclosing said open circuit below a predetermined rotatable member speed, means including a reversing switch for energizing said running field exciting winding in the same sense on a closure thereof in both directions, means including said reversing switch for connecting said starting field exciting winding for energization in opposite directions on closure thereof in opposite directions, and means including another circuit breaker mechanically connected to said reversing switch and operable thereby, said circuit breaker being arranged across said speed responsive circuit breaker for closing the circuit of said starting field exciting winding across said speed responsive circuit breaker on operation of said reversing switch from one closed circuit position to the other, and a mechanical time delay device for holding closed said other circuit breaker for a predetermined time after closure thereof responsive to closure of said reversing switch in either direction whereby a braking torque is generated on said motor rotating in one direction when said reversing switch is closed for rotation in the opposite direction so that said rotatable member may be stopped and restarted in either direction.

ROGER A. FULLER.

REFERENCES CITED

The following references are of record in the file of this patent:

UNITED STATES PATENTS

| Number | Name | Date |
|---|---|---|
| 2,117,123 | Werner | May 10, 1938 |
| 2,280,888 | Buchanan | Apr. 28, 1942 |